(12) United States Patent
Tewari et al.

(10) Patent No.: US 10,955,830 B2
(45) Date of Patent: Mar. 23, 2021

(54) SYSTEMS AND METHODS FOR DESIGNING AND SECURING EDGE DATA PROCESSING PIPELINES

(71) Applicant: NEBBIOLO TECHNOLOGIES, INC., Milpitas, CA (US)

(72) Inventors: Ruchir Tewari, Mountain View, CA (US); Kannan Devarajan, Cupertino, CA (US); Pankaj Bhagra, Fremont, CA (US)

(73) Assignee: Nebbiolo Technologies, Inc., Milpitas, CA (US)

( * ) Notice: Subject to any disclaimer, the term of this patent is extended or adjusted under 35 U.S.C. 154(b) by 0 days.

(21) Appl. No.: 16/270,880

(22) Filed: Feb. 8, 2019

(65) Prior Publication Data

US 2020/0257275 A1  Aug. 13, 2020

(51) Int. Cl.
*G05B 19/418* (2006.01)
*G06Q 10/06* (2012.01)
*H04L 29/06* (2006.01)

(52) U.S. Cl.
CPC . *G05B 19/41845* (2013.01); *G05B 19/41865* (2013.01); *G06Q 10/06312* (2013.01); *H04L 63/164* (2013.01); *G05B 2219/31073* (2013.01); *G05B 2219/32085* (2013.01)

(58) Field of Classification Search
CPC ........ G05B 19/41845; G05B 19/41865; G05B 2219/31073; G05B 2219/32085; G06Q 10/06312; H04L 63/164
See application file for complete search history.

(56) References Cited

U.S. PATENT DOCUMENTS

| | | | |
|---|---|---|---|
| 9,300,625 B1* | 3/2016 | Potlapally | H04L 63/04 |
| 2015/0195616 A1* | 7/2015 | Espinosa | H04N 21/8456 725/93 |
| 2016/0142393 A1* | 5/2016 | Wang | H04L 63/029 726/7 |

* cited by examiner

*Primary Examiner* — Arvin Eskandarnia
(74) *Attorney, Agent, or Firm* — Barry Choobin; Patent 360 LLC

(57) ABSTRACT

According to some exemplary embodiments, the present disclosure is directed to a secure edge datastream processing and distribution system comprising a trusted datastream with metadata indicating ownership and access rights added at an edge. Further embodiments include sensors, machines or robots sending sensor data attributes to a fog operating system data pipeline, the fog operating system data pipeline sending dynamic data tags to secure containers and/or the fog operating system data pipeline sending role and org assignment data to secure containers. The secure containers may send correlated edge analytics to an authorization policy engine, and/or the secure containers may send datastream identification definition data to an authorization policy engine.

6 Claims, 1 Drawing Sheet

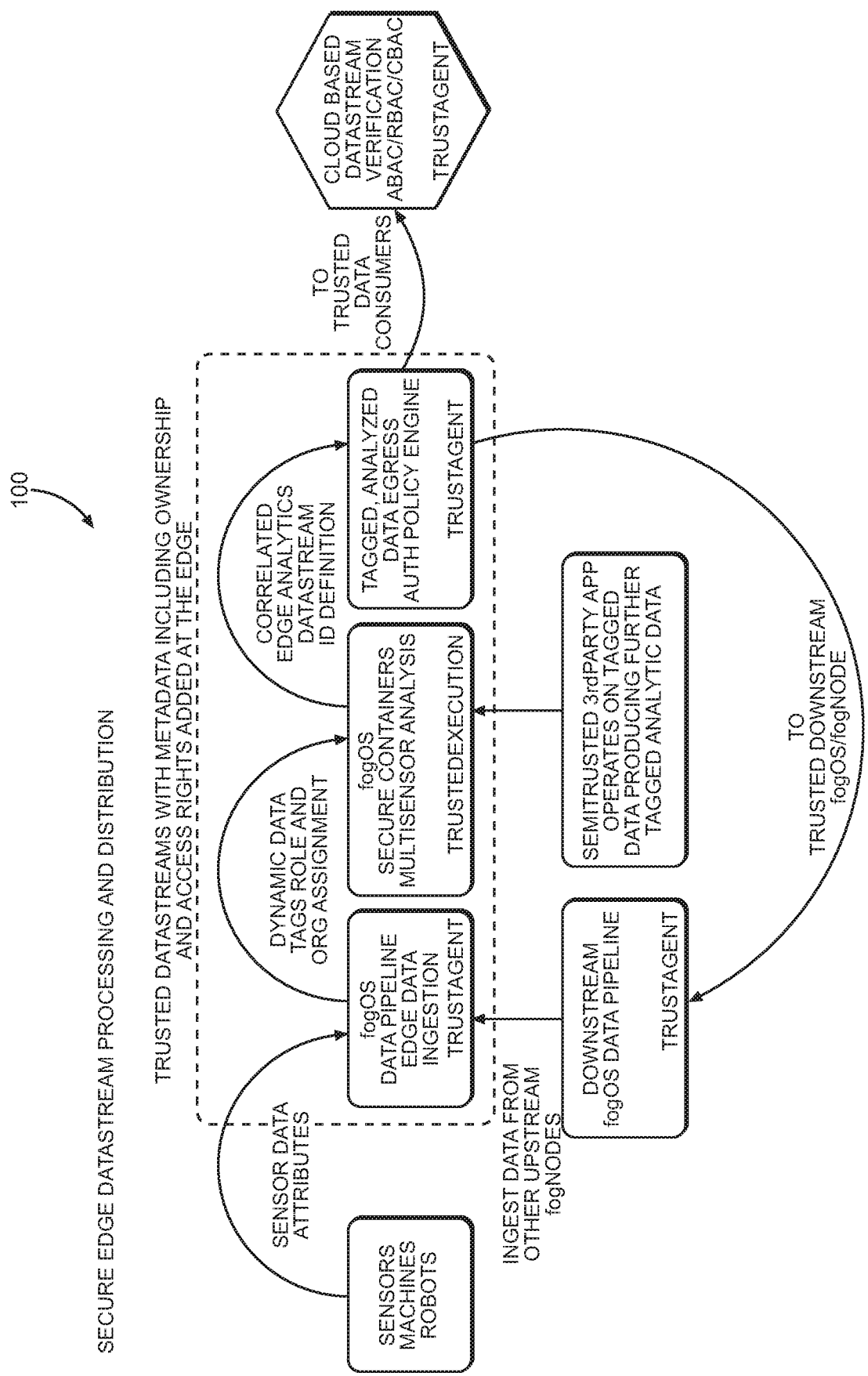

SYSTEMS AND METHODS FOR DESIGNING AND SECURING EDGE DATA PROCESSING PIPELINES

CROSS REFERENCE TO RELATED APPLICATIONS

This application is related to U.S. Non-Provisional patent application Ser. No. 15/468,004 filed on Mar. 23, 2017 and titled "Fog Computing Facilitated Flexible Factory," which claims the benefit and priority of U.S. Provisional Application Ser. No. 62/313,640, filed on Mar. 25, 2016, titled "Fog Computing Facilitated Flexible Factory" which are hereby incorporated by reference in their entireties, including all references and appendices cited therein. This application is also related to U.S. Non-Provisional patent application Ser. No. 15/785,290 filed on Oct. 16, 2017 and titled "Enterprise Grade Security for Integrating Multiple Domains with a Public Cloud," which claims the benefit and priority of U.S. Provisional Application Ser. No. 62/411,422, filed on Oct. 21, 2016, titled "Enterprise Grade Security Enablement for IT/OT Device Integration Into Public Cloud," which are hereby incorporated by reference in their entireties, including all references and appendices cited therein.

FIELD OF INVENTION

The present disclosure is directed to security of data in fog computing.

SUMMARY

According to some exemplary embodiments, the present disclosure is directed to a secure edge data stream processing and distribution system. A raw data stream is converted to a semi-trusted datastream by addition of metadata indicating ownership and access rights added at the edge by a configurable trusted edge data ingestion entity. Further embodiments include sensors, industrial machines or robots sending their data streams to a fog operating system data pipeline, the fog operating system data pipeline adding dynamically generated tags, roles, orgs to the datastream. The trusted datastream may be forwarded by edge processing units such as secure containers. The secure containers may generate and send further identification data or correlated edge analytics to an authentication and authorization policy engine ("auth policy engine").

In various exemplary embodiments, the auth policy engine may send one or more forms of data to remote trusted data consumers at the edge. The auth policy engine may also send one or more forms of data to a cloud based datastream. In yet further embodiments, the auth policy engine may send one or more forms of data to a downstream fog operating system data pipeline, and the downstream fog operating system data pipeline may send one or more forms of data to the fog operating system data pipeline.

DESCRIPTION OF THE DRAWINGS

Certain embodiments of the present technology are illustrated by the accompanying FIGURE. It will be understood that the FIGURE is not necessarily to scale. It will be understood that the technology is not necessarily limited to the particular embodiments illustrated herein.

FIG. 1 shows an exemplary secure edge datastream processing and distribution system and method.

DETAILED DESCRIPTION

The Fog Computing Facilitated Flexible Factory is a novel approach for manufacturing a variety of components and products that share a common trait, and/or a novel approach for enabling flexibility and efficiency in services performed in a factory like painting, welding, packaging, bottling, assembling, etc. The mechanism uses fog computing nodes as edge device controllers as well as edge devices to perform the required control, communications, analytics and data processing at the factory site to achieve the flexible factory.

The principal characteristic of the Fog Computing Facilitated Flexible Factory is to reduce or eliminate the downtime of a factory element like equipment, a manufacturing cell, a shop floor or a plant triggered by factors that are outside the boundary or influence of the affected factory element. The underlying goal of the flexible factory concept is to maximize productivity, minimize cost and increase revenue. A factory element that would in ideal conditions produce components and products around the clock, may idle due to the unavailability of raw materials or tools, failures or congestion in upstream production lines and other certain short term scenarios measured in terms of, seconds, minutes, hours or days. The factory element may also idle for a longer term, e.g., a few weeks to a month, due to factory line reworking or lack of orders due to low demand. In this sense, the fast adaptability of a manufacturing plant to new products, with shortened set-up times, is a goal of the flexible factory.

Fog computing facilitates management and control of industrial devices like robots, computer numeric controlled ("CNC") machines, manufacturing machines, sensors, actuators, power management devices, air handlers, coolant circulating pumps and other devices, which are collectively called operational technology ("OT") devices, which are present in industrial floors, power plants, oil and gas rigs, high-end data centers and other sectors.

The management of these OT devices requires computer servers, network connectivity and associated network equipment, storage devices and associated software, which are collectively called informational technology ("IT") infrastructure.

The following are some of the key objectives and goals of the Fog Computing Facilitated Flexible Factory:

1. Support both manufacturing and service-oriented factories.

2. Agile Manufacturing/Services: provide a method and apparatus for a factory to change the production or service work flow within a factory, change the programmable logic controller ("PLC") programs (ladder diagrams), change the logistics of material handling flow (raw materials, scrap and produced product), change the tooling and other needed functions as soon as possible and go into production or service enablement.

3. Improve overall production capacity: enable a modern factory to support a multi-dimensional business logic and logistics that accepts different types of work orders with priorities, a site to site automatic work ordering process without any human intervention, a mechanism to constantly reevaluate the priorities and change the complete production/service cycle to optimize the overall productivity.

4. Supply chain optimization: provide a mechanism and apparatus to monitor the raw material inventory levels and to track raw material orders required for the current production or service cycle and switch to a different work order in a flexible way.

5. Asset utilization optimization: enable the ability of a factory to change the current work (product or service) based on the availability and localization of tools and skilled operators.

6. Asset Management: enable condition monitoring of different factory elements like machines, cells, plants and zones for failures, and predict failures and detect anomalies.

7. Enable asset/device data collection, data stream definition by defining data signals that contribute to a data stream, data ownership definition through cryptography and role based access control ("RBAC") functions and transport such streams to function end points that compute business decisions based on business logic.

Integrating security with applications that are provisioned to the edge is currently a hard problem with security gaps, as evidenced by multiple recent industrial hacks where a malicious software is able to deploy malware or ransomware onto an industrial controller. In one example, a sophisticated malware invaded the safety system of a critical infrastructure facility installing a Remote Access Trojan (RAT). The attack relied on weak authentication controls for access between system components. In recent years, hackers have placed increasing attention on breaking into utilities, factories and other types of critical infrastructure. Such attacks could allow hackers to shut down safety systems in advance of attacking an industrial plant, which could prevent plants from identifying and halting destructive attacks on those facilities. The attack demonstrates that plant safety systems could be fooled to indicate that everything is okay when hackers are potentially damaging a plant in the background.

According to current exemplary embodiments for solving such problems, named keys for various security operations on the plant controller fog nodes and the master fog node are generated. The named keys can be integrated visually into the data pipeline by adding encrypt, decrypt, sign, and/or verify security processing nodes which reference the named keys. The value of the keys can be changed or rotated based on a pre-defined schedule or an event trigger such as an indication of an attack.

In various exemplary embodiments, the security infrastructure takes advantage of trusted execution contexts as found in U.S. Non-Provisional patent application Ser. No. 15/785,290 filed on Oct. 16, 2017 and titled "Enterprise Grade Security for Integrating Multiple Domains with a Public Cloud," to provide the security services in a trusted manner.

For example, both the plant controller fog node and device have a lightweight trusted key verification functionality that enables them to receive code in a trusted manner. The device is able to request and offload security function(s) to the plant controller fog node. As a result, the complexity of the processing pipeline is reduced and the trustworthiness of remotely deployed analytics is increased. Additionally, various functions may reside in the cloud and some parts could be deployed to the edge.

In various exemplary embodiments, because of the decoupling of the keys and because the keys are generated in a trusted manner on the platform, the entire pipeline is secure. Essentially two nodes that want to talk to each other would have the same named key without revealing the actual contents of the key.

In addition to the plant controller fog node having this functionality, the device, such as a robot in this case, could also have a lightweight program that enables it to verify information that it is sending or receiving with a certain named key.

FIG. 1 shows an exemplary secure edge datastream processing and distribution system and method 100.

Illustrated in FIG. 1 is the internal design of a fog node and what it does when a certain data pipeline is defined and received on it.

Starting from the left and moving to the right, a robot is sending certain data which is injected into the data pipeline by a trust agent. The robot is sending data of various types. One is its current location, as it is moving. It sends several mathematical objects which describe the position, the velocity, momentum, and other such attributes. It is also sending information if there is any malfunction. It has certain codes that indicate malfunctions or anomalous states inside it or making codes that it determines that are relevant to an external audience. For instance, for maintenance it is sending those codes in addition to the real time data. Thus, the first step is getting the data in a trusted manner. At this point, there is no processing. It is just known that a certain robot sent information. In various exemplary embodiments, the robot authenticated the information with a certain key that was assigned to it, like robot 1, 2, 3 might get a key named robot 1, 2, 3, and it sends data under that key and authenticated under that key.

The next part is where the pipeline begins, which is the security function. It is the processing function that was defined in the pipeline, which could be a virtual machine ("VM"), a container, or a function. This is the part where the edge is processing a certain piece of information, and the security function that is applied is to associate various tags such as role and org or other attributes that define the data. For example, two types of data from a single robot can be distinguished. The first type is an error code that could be interpreted by the robot manufacturer and is of no or little use to the robot owner. The second type of data could be manufacturing data (e.g. number of widgets made by the robot) that the robot owner does not want the robot manufacturer (or others) to know. These two types of data can be tagged and secured in the fog node.

Within each org, one could have a role associated with it. For example, in the real time, data could be destined towards a role of a data analyst. The codes that were just mentioned, such as error codes in the robot, could be destined for a maintenance professional who would be in a different role in that organization.

In many exemplary embodiments, tags could be something defined based on the type of data, which could be anything from real time data and/or a type associated with data which might indicate the data must reach its destination within a certain time duration otherwise it loses its meaning. This would elevate its priority throughout the rest of the pipeline.

The functions then process the data stream, including (in some cases) performing coordinated analytics. For example, comparing the data with the robot's data along with the data of other robots. For example, how one robot is different from the other robots. Or the data stream could be sent directly outside. For example, the amount of data being processed could be reduced, so it can add information to it by comparing it with other data streams. Thus, it becomes a third focal point which is the egress point which is where a trust agent again signs or encrypts the data and sends it to the cloud.

Referring again to FIG. 1, with respect to the statement, "Ingest data from other fog nodes," because the fog nodes act in a collaborative manner, one fog node could be sending data about the robots to other fog nodes for them to be able to perform comparative analytics. With respect to the statement, "Semi-trusted third-party application operates on tag data producing further tagged analytic data," is where the containers and functions are treated as semi-trusted third-party applications. Accordingly, one could deploy containers that are not fully trusted, however, reestablish the security boundaries under which that function or container could operate. The reason why it is semi-trusted is one still has to be aware of what the function is doing. If it is something totally different and malicious, it cannot be used. As long as it is not, for example there is a bit of shared trust, such as an operation with encryption, decryption, signing and verification of data that's coming into and going out of a function, it can be used.

In further exemplary embodiments, one can focus on a design for a plug and play application that would be useful for a robot. For example, a developer comes up with a great robot edge application. One can deploy a function into the fog OS and be confident that the data that's coming out is encrypted in a way such that only the trusted recipients will be able to open it. In this case, it is an example of a third-party application that one can bring into a system, but established security boundaries are in place which that application is receiving and sending out data.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGURES illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A secured datastream processing and distribution system configured to be used in predetermined plant operations, said system comprising:
   at least one plant controller fog node and at least one device operable as a part of said plant operations, said plant controller fog node communicably coupled to said device via a pre-defined data pipeline implemented by a predetermined fog operating system, and wherein:
   said data pipeline is configured with a plurality of named keys indicative of a plurality of security functions executable on said plant controller fog node and said device, and wherein values of each of said named keys are modified based at least on one of a pre-defined schedule and an event trigger;
   at least one of security functions executable on said plant controller fog node and said device includes a tagging function, and wherein said tagging function is configured to dynamically generate pre-defined data tags indicative of information processed by said plant controller fog node and said device, and wherein said data tags define at least one of a role, an organization, and type of said information, and wherein said data pipeline is further configured to transmit said data tags in combination with said information to a pre-defined secured container as said datastream via said data pipeline;
   said secured container is configured to compare and correlate said information with a second set of information processed by a second device operable as a part of said plant operations, and thereby generate comparative analytics and coordinated analytics; and
   said secured container is further configured to define said datastream as a combination of data signals constituting said datastream, and thereby generate datastream identification definition data, based on said data signals, said secured container further configured to transmit said datastream identification definition data to a predetermined authorization policy engine.

2. The secured datastream processing and distribution system as claimed in claim 1, wherein said device and said second device are selected from a group of devices consisting of sensors, robots, and industrial machines.

3. The secured datastream processing and distribution system as claimed in claim 1, wherein:
   said named keys are embedded into said data pipeline by adding to said data pipeline, processing nodes respectively referencing each of said named keys and pre-configured to execute each of said plurality of security functions;
   said processing nodes include at least one of encrypt processing nodes, decrypt processing nodes, signature processing nodes, and verification processing nodes;
   said named keys are configured to be utilized to encrypt, decrypt, sign and verify said information received and processed by said plant controller fog node and said device; and
   said plant controller fog node communicates with said device, only in an event said plant controller fog node and said device are determined to be using a same named key, and wherein said plant controller fog node and said device are configured to utilize said same named key for communication, without necessitating revelation of said information underlying said same named key, thereby facilitating decoupling of said same name key from said information underlying said same named key, and thereby rendering said datastream and data pipeline to be secure.

4. The secured datastream processing and distribution system as claimed in claim 1, wherein said plant controller fog node and said device are embedded with a trusted key verification function, said trusted key verification function enabling said plant controller fog node and said device to intercommunicate in a secured manner over said data pipeline.

5. The secured datastream processing and distribution system as claimed in claim 1, wherein said device is configured to offload said security functions to said plant controller fog node, and wherein said device is further configured to request for execution of said security functions on said plant controller fog node.

6. The secured datastream processing and distribution system as claimed in claim 1, wherein said named keys are configured to be utilized for authenticating said information received and processed by said plant controller fog node and said device.

* * * * *